United States Patent
Hily et al.

(10) Patent No.: US 7,174,428 B2
(45) Date of Patent: Feb. 6, 2007

(54) METHOD AND SYSTEM FOR TRANSFORMING MEMORY LOCATION REFERENCES IN INSTRUCTIONS

(75) Inventors: Sebastien Hily, Hillsboro, OR (US); Per H. Hammarlund, Hillsboro, OR (US); Avinash Sodani, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 10/745,700

(22) Filed: Dec. 29, 2003

(65) Prior Publication Data

US 2005/0149702 A1    Jul. 7, 2005

(51) Int. Cl.
*G06F 12/00* (2006.01)

(52) U.S. Cl. .......................... 711/133; 711/1; 711/100; 711/170; 711/221; 712/223; 712/225

(58) Field of Classification Search ................ 711/133, 711/170, 221, 1, 100; 712/223, 225
See application file for complete search history.

(56) References Cited

U.S. PATENT DOCUMENTS

| | | | | | |
|---|---|---|---|---|---|
| 5,751,983 | A | * | 5/1998 | Abramson et al. | 712/216 |
| 5,802,337 | A | * | 9/1998 | Fielden | 712/216 |
| 5,838,941 | A | * | 11/1998 | Valentine et al. | 712/217 |
| 5,911,057 | A | * | 6/1999 | Shiell | 712/217 |
| 6,192,464 | B1 | * | 2/2001 | Mittal | 712/200 |
| 6,202,204 | B1 | * | 3/2001 | Wu et al. | 717/151 |
| 6,505,293 | B1 | * | 1/2003 | Jourdan et al. | 712/217 |
| 6,609,189 | B1 | * | 8/2003 | Kuszmaul et al. | 712/23 |
| 6,625,723 | B1 | * | 9/2003 | Jourday et al. | 712/217 |
| 6,658,559 | B1 | * | 12/2003 | Arora et al. | 712/245 |
| 2004/0034678 | A1 | * | 2/2004 | Kuszmaul et al. | 708/446 |
| 2005/0055516 | A1 | * | 3/2005 | Menon et al. | 711/158 |

* cited by examiner

*Primary Examiner*—Stephen C. Elmore
(74) *Attorney, Agent, or Firm*—Kenyon & Kenyon LLP

(57) ABSTRACT

Embodiments of the present invention provide a method, apparatus and system for memory renaming. In one embodiment, a decode unit may decode a load instruction. If the load instruction is predicted to be memory renamed, the load instruction may have a predicted store identifier associated with the load instruction. The decode unit may transform the load instruction that is predicted to be memory renamed into a data move instruction and a load check instruction. The data move instruction may read data from the cache based on the predicted store identifier and load check instruction may compare an identifier associated with an identified source store with the predicted store identifier. A retirement unit may retire the load instruction if the predicted store identifier matches an identifier associated with the identified source store. In another embodiment of the present invention, the processor may re-execute the load instruction without memory renaming if the predicted store identifier does not match the identifier associated with the identified source store.

29 Claims, 5 Drawing Sheets

METHOD AND SYSTEM FOR TRANSFORMING MEMORY LOCATION REFERENCES IN INSTRUCTIONS

TECHNICAL FIELD

Embodiments of the present invention relate to processors. More particularly, the present invention relates to a memory management method and apparatus that enables efficient memory renaming.

BACKGROUND OF THE INVENTION

Most instructions in a computer instruction set operate on several source operands to generate results. The instructions name, either explicitly or through an indirection, the source and destination locations where values are read from or written to. A name may be either a logical, or architectural, register or a location in memory.

Instructions involving register operands are faster than those involving memory operands. For some microprocessor architectures, instructions naming memory operands are translated, or decoded, into micro-instructions that transfer operand values from memory to logical registers and then perform the decoded computations. The number of logical registers, however, often is limited, and, as a result, compilers should efficiently utilize logical registers to generate efficient code.

The number of physical registers available in a microprocessor typically exceeds the number of logical registers, so that register renaming may be utilized to increase performance. In particular, for out-of-order processors, register renaming allows instructions to be executed out of their original program order. Thus, for many out-of-order processors, an instruction is renamed so that logical registers named in the original instruction are renamed to physical registers.

Renaming a logical register involves mapping a logical register to a physical register. These mappings are stored in a Register Alias Table ("RAT"). A RAT maintains the latest mapping for each logical register. A RAT is indexed by logical registers, and provides mappings to corresponding physical registers. This activity may be called dependency tracking.

FIG. 1 depicts a register renaming and dependency tracking scheme involving three structures: RAT 110, active list 102, and free list 104. For each logical register specified by a renamed instruction, an unused physical register from free list 104 is allocated. RAT 110 is updated with this new allocation. Physical registers are free to be used again, or reclaimed, once they cannot be referenced by instructions in the current instruction window.

Based upon the data structures depicted in FIG. 1, one method for register reclaiming is to reclaim a physical register when the instruction that evicted it from RAT 110 retires. Thus, the instruction that provides the new allocation to the physical register is retired. As a result, whenever a new allocation updates RAT 110, the evicted old allocation is pushed into active list 102. An active list 102 entry is associated with each instruction in the instruction window. When an instruction retires, the physical register of the old allocation recorded in active list 102, if any, is reclaimed and pushed into free list 104. The cycle is depicted in FIG. 1.

Conventional memory renaming impacts the RAT and requires extra management of the RAT through the use of additional hardware such as state bits and register reference counters. The whole mechanism is very complex, and suffers certain performance limitations such as a short time window a Load instruction has to be memory renamed if the source of the store is overwritten. A memory renaming technique that does not suffer from the limitations of conventional renaming techniques, for example, one that does not require complex management of the regular RAT is needed.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Embodiments of the present invention provide a method, apparatus and system for memory renaming. For example, embodiments of the present invention may transform a single instruction such as a load instruction that is predicted to be memory renamed into, for example, two independent instructions. One of the instructions may be a move (MV) instruction to read a cache based on a predicted store identifier. The other instruction may be a load check (LD-CHK) instruction that may compare an identifier associated with a source store with the predicted store identifier. If the identifier associated with the source store matches the predicted store identifier, the memory renaming technique is successful and the load instruction may be retired.

Figure 1:
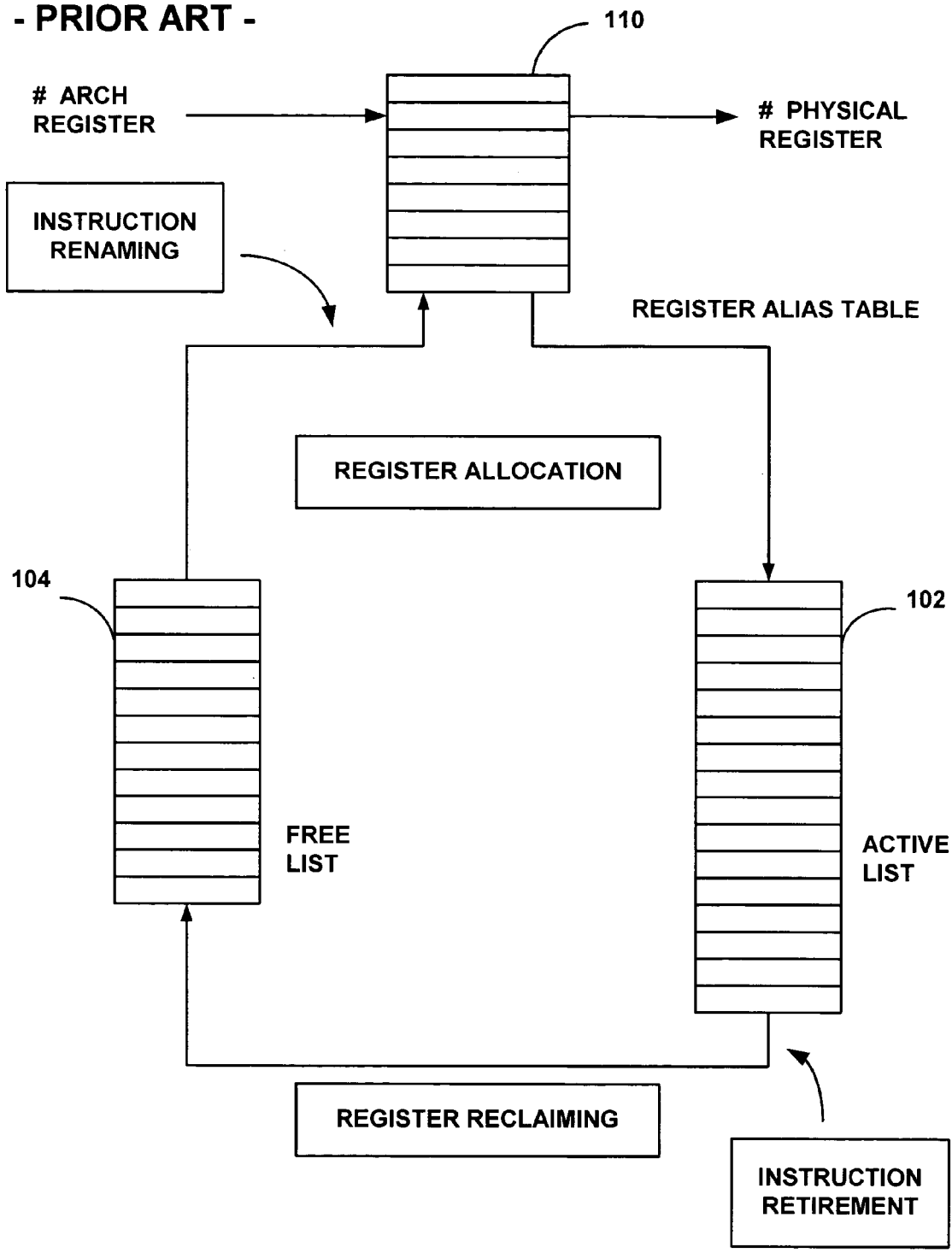
FIG. 1 is a system for register renaming as known in the art.
Figure 2:
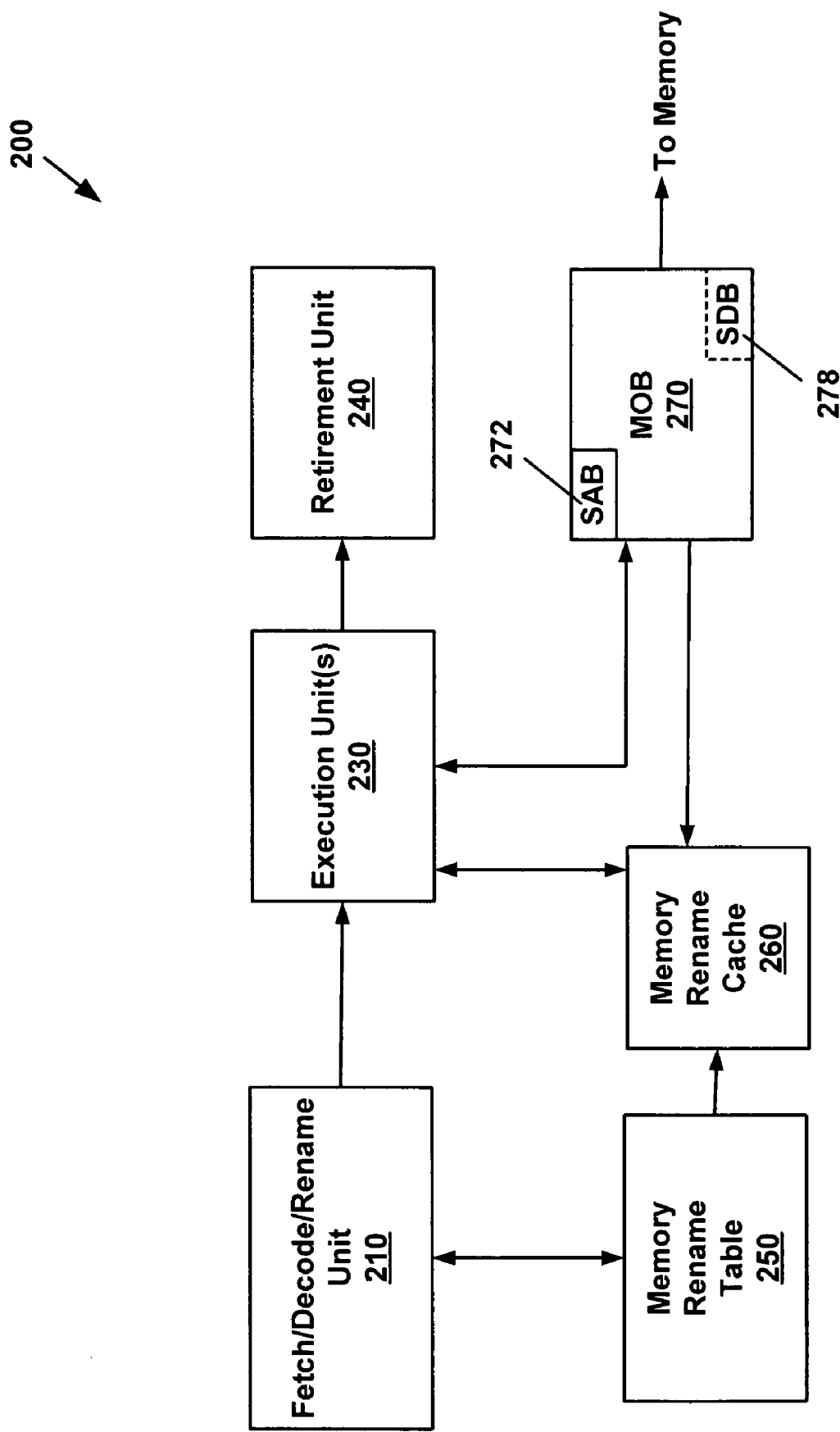
FIG. 2 illustrates a block diagram of a processor including a system for memory renaming constructed according to an embodiment of the present invention.

FIG. 2 is a simplified block diagram of a system including a portion of a processor 200 in which embodiments of the present invention may find application. Processor 200 may be an out-of-order processor or any other type of processor. It should be recognized that the block configuration shown in FIG. 2 and the corresponding description is given by way of example only and for the purpose of explanation in reference to the present invention. It is recognized that the processor 200 may be configured in different ways and/or may include other components and/or sub-components.

In an embodiment of the present invention, a fetch/decode/rename unit 210 may fetch instructions from a storage location, for example, an instruction cache (omitted), and may decode the instructions. For a Complex Instruction Set Computer ("CISC") architecture, fetch/decode/rename unit 210 may decode a complex instruction into one or more micro-instructions. Usually, these micro-instructions define a load-store type architecture, so that micro-instructions involving memory operations may be practiced for other architectures, such as Reduced Instruction Set Computer ("RISC") or Very Large Instruction Word ("VLIW") architectures. It is to be noted that no distinction is made between instructions and micro-instructions unless otherwise stated, and are simply referred to herein as instructions.

In FIG. 2, in accordance with an embodiment of the present invention, fetch/decode/rename unit 210 may be coupled to a memory rename table 250, and one or more execution units 230. The execution unit(s) 230 may be coupled to a memory ordering buffer ("MOB") 270, retirement unit 240 and memory rename cache 260. As shown, the memory rename cache 260 may be coupled to memory rename table 250. The MOB 270 may be coupled to a longer term memory, for example, a cache memory, a random access memory (RAM), a dynamic RAM (DRAM), and the like.

In embodiments of the present invention, the MOB 270 may include, for example, a store address buffer ("SAB") 272 and a store data buffer ("SDB") 278. Other embodiments are contemplated in which some or all of the SAB 272 and the SDB 278 may be implemented separate of, but still coupled to, MOB 270. The MOB 270 may be used to validate and/or invalidate the prediction.

In FIG. 2, in accordance with an embodiment of the present invention, SAB 232 may be used to store information related to the store. This information may include a store address for the data of the store, a store type, etc. A store buffer identification ("SBID") may also be associated with each instruction such as a store. A SBID may be associated with a store in-order, that is, after the store is fetched/decoded but before it is executed. The SBID may point directly to the store entry in SAB 272 and SDB 278. In addition, a tail pointer may be implemented in SAB 272 to point to the oldest store in SAB 272. A wrap-around bit may also be associated with SAB 272 that may be toggled each time all of the SBIDs have been allocated, which may help keep track of the relative age of each store in SAB 272. Thus, the SBID may be used to ensure the proper "age-ordering" of an instruction in relation to all other currently active store instructions.

As such, the SBID's may be allocated in-order and may not be available to be reused until they have been de-allocated from processor 200. A store information entry in SAB 272 may be de-allocated when the associated data is written out to memory. The SDB 278 may include data associated with the store. The SDB 278 may be located external to MOB 230 and/or may also be internal to MOB 230, as shown in FIG. 2. Regardless of where SDB 278 is located, it may have a one-to-one correlation with the address information in SAB 272 to ensure the store addresses are always associated with the correct store data. Moreover, although the memory rename cache 260 is shown separate from the MOB 270, it is recognized that the memory rename cache 260 may be incorporated within, for example, the SDB 278 of the MOB 270.

In an embodiment of the present invention, an instruction such as a load instruction may move a value held in a memory location into a logical register. If it happens that the load instruction in the instruction window accesses the same memory location as an older store instruction, the load instruction may be memory renamed (e.g., the load instruction transformed to refer to a different memory location) to use the data in the register location of the data of the older store instruction, in accordance with embodiments of the present invention (described below in detail).

A detection system, such as one known in the art, may be used to predict or ascertain that such a load instruction exists. The memory rename scheme, in accordance with embodiments of the present invention may be applied to eliminate the load from having to retrieve the data from memory external to processor 200, for example, DRAM. Performance may be increased because latency of the load should not be incurred and the load memory traffic to memory is reduced. The load latencies associated with the different types of memory may be, for example, about 4 cycles for a first level cache memory, about 300 to 400 cycles for DRAM, but only 1 cycle for a register.

Figure 3:
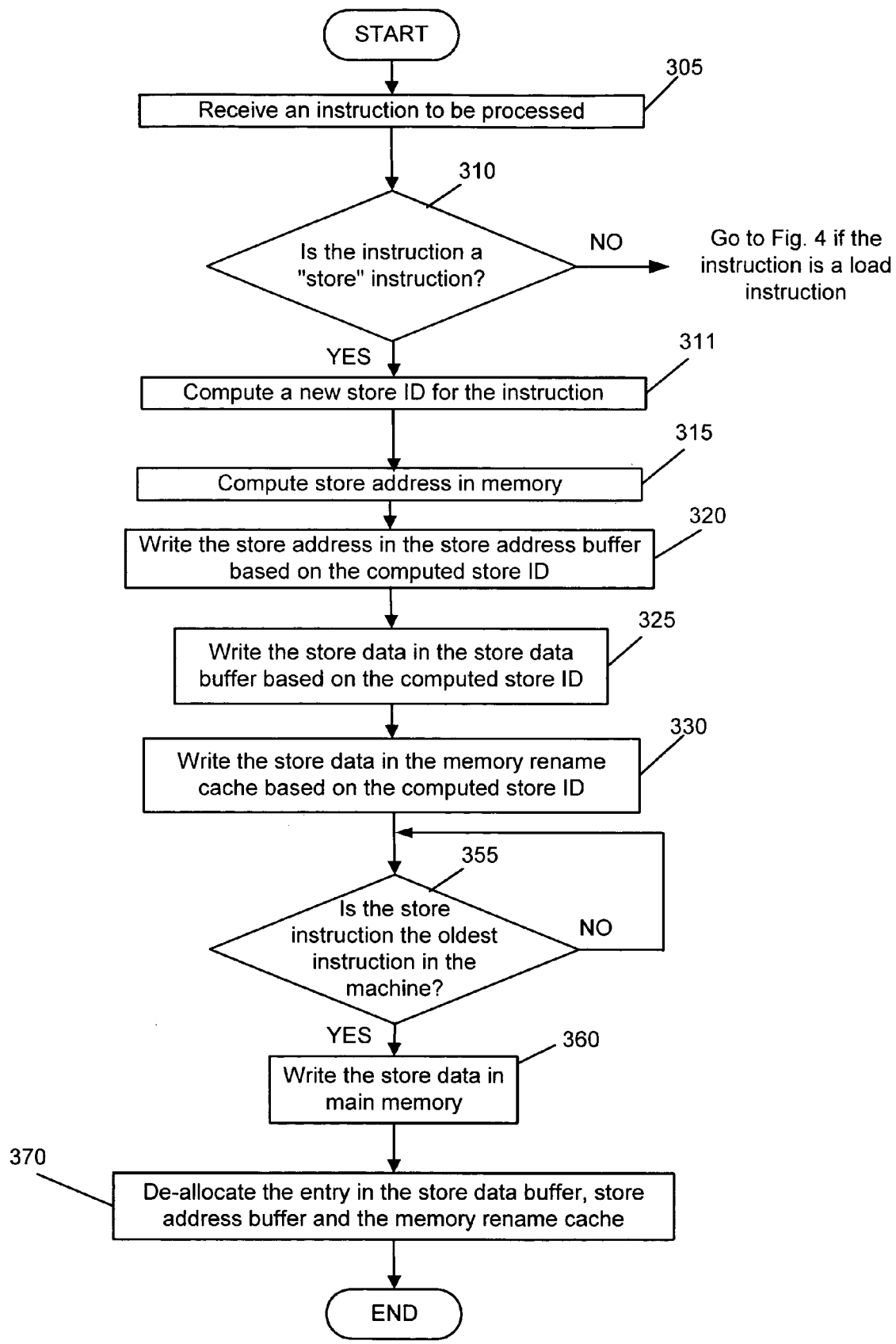
FIG. 3 is a flow chart illustrating a method in accordance with an embodiment of the present invention.

FIG. 3 is a flowchart that illustrates a method in accordance with an embodiment invention. In embodiments of the present invention, an instruction may be received and if the instruction is a store instruction, a new store ID may be computed, as shown in boxes 305, 310 and 311. The computed store ID may indicate a location in a store data buffer such as SDB 278 where the store instruction may write the data. A store address in memory may be computed, as shown in box 315. The store address may specify where the store instruction may write the data in memory such as main memory. If the received instruction is a load instruction, the method illustrated in FIG. 4 may be implemented, starting at box 415, in accordance with embodiments of the present invention. It is recognized that if the instruction is other than a load or a store instruction, it may be processed normally by the processor 200.

As shown in box 320, the computed store address may be written in the store address buffer such as SAB 272 based on the computed store ID. The store data may be written to the store data buffer such as SDB 278 based on the computed store ID, as shown in box 325. The store data may be written into a memory rename cache such as cache 260 based on the computed store ID, as shown in box 330. Once the store instruction is the oldest store instruction in the machine, the data associated with the store instruction may be written into memory, as shown in boxes 355 and 360. The oldest instruction in the machine may be a sequential instruction after all previous instructions in the machine have been executed. As shown in box 370, the entry in the store data buffer, the entry in the store address buffer and the entry in the memory rename cache may be de-allocated. In other words, the store address that was written to the store address buffer, the store data that was written to the store data buffer and the store data that was written to the memory rename cache earlier may be de-allocated.

Figure 4:
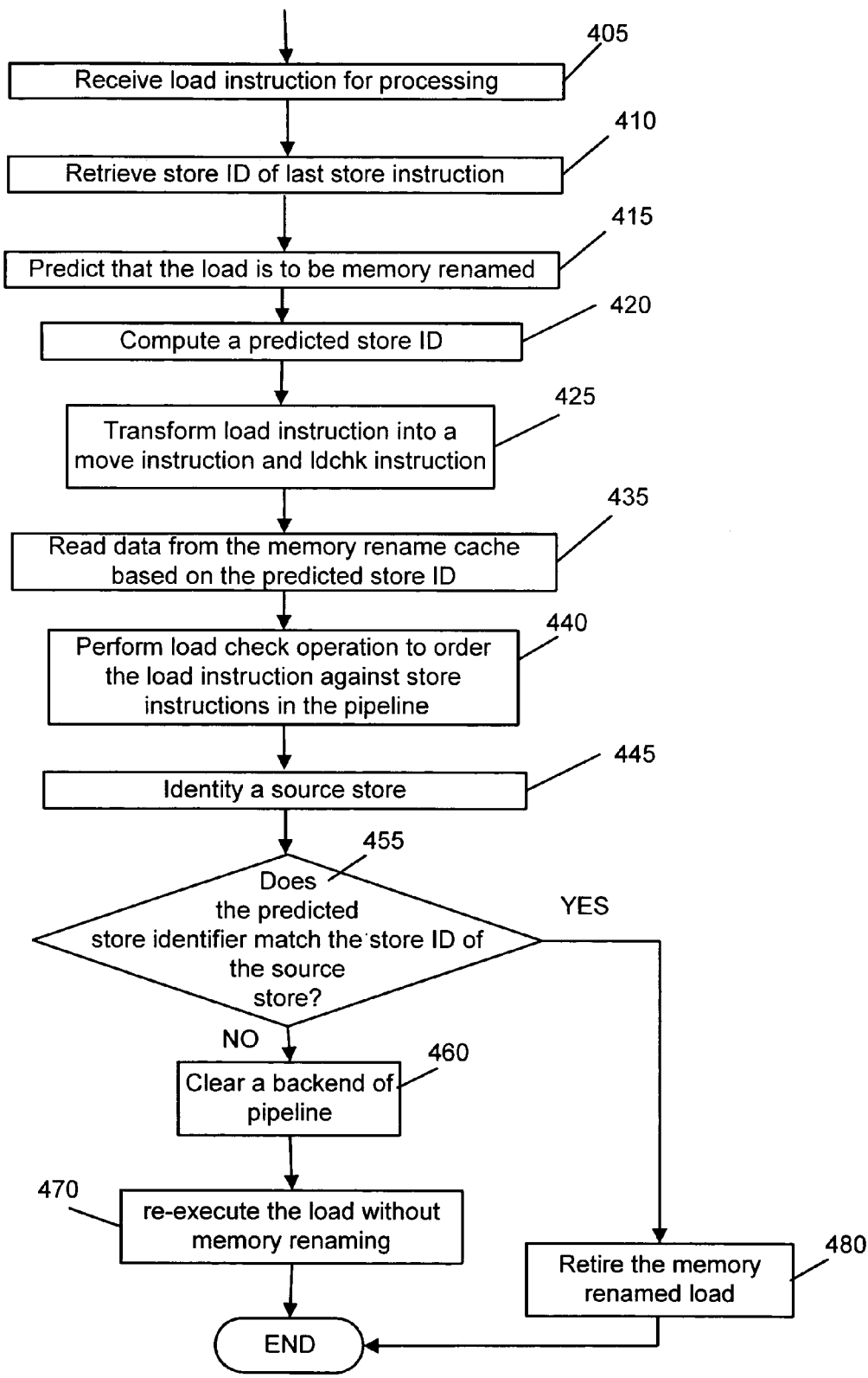
FIG. 4 is a flow chart illustrating a method in accordance with an embodiment of the present invention.

FIG. 4 is a flowchart that illustrates a method in accordance with an embodiment of the present invention. As shown in box 405, a load instruction may be received for processing. The store ID of the last store instruction may be retrieved, as shown in box 410. The store ID of the last instruction may be the store ID computed in box 311, FIG. 3. The store ID may be used to identify the youngest store when the load was fetched (sometimes called store color or Youngest of the Older Store (YOS)). In other words, the retrieved store ID can be used to determine the age of the instruction as compared to other instructions such as store and/or load instructions in the pipeline.

In embodiments of the present invention, the load instruction may be predicted to be memory renamed (i.e., a prediction that an older store will be executed providing a different memory location for the data for the load instruction) and a predicted store identifier (ID) may be computed, as shown in boxes 415 and 420. The predicted store TD may be used to identify the store that are older than the load and that may provide the data to the load. In accordance with embodiments of the present invention, the load instructions may be transformed into a memory move (MV) instruction and/or a load check (LDCHK) instruction, as shown in box 425. In embodiments of the present invention, the load instruction may be transformed into two instructions (e.g., MV and LDCHK) or a fused single instruction that performs essentially the same function as the MV and the LDCHK operations. The MV instruction may be processed to read data from the memory rename cache such as cache 260 based on the predicted store ID, as shown in box 435. In embodiments of the present invention, the data to be read from the memory rename cache may be written to the memory rename cache 260 during the store operation described in FIG. 3, box 330.

In embodiments of the present invention, a LDCHK operation may be performed to determine whether a memory renaming prediction for a load instruction was correct (i.e., a prediction was correct and an older store is (is to be) executed providing a different memory location for the data for the load instruction). For example, the LDCHK operation may compare an identifier associated with an identified source store with a predicted store identifier. If there is a match, then the memory renaming prediction was correct and the load instruction can retire. If a match is not found, then the load instruction may be re-executed without memory renaming.

Referring again to FIG. 4, the load instruction may be ordered against store instructions in the pipeline, as shown in box 440. Ordering the load instructions against the store instructions may determine which stores are younger and which stores are older. Older stores may be identified as possible sources for the load. Moreover, address and data size of the older stores may be compared with the address and data size of the load to determine which stores may be candidate stores that may be eligible to provide their data to the load. If there is a full or partial overlap of the address and/or data size, those stores may be candidate stores that may be eligible to provide their data to the load. In embodiments of the present invention, the LDCHK operation and/or the MV operation can be performed in any order and/or may be performed in parallel.

In embodiments of the present invention, once such candidate stores are identified based on age, address size, data size, etc., the youngest of such candidate stores (e.g., the youngest of the older matching stores) may be identified as the source store that may provide data to the load, as shown in box 445. If the load is predicted to be memory renamed and the source store source can be identified, the predicted store ID may be compared to the store ID of the identified source store that may provide data to the load. If the predicted store ID matches the store ID of the identified source store, then the memory renaming operation, in accordance with embodiments of the present invention, was successful and the load instruction can be retired, as shown in boxes 455 and 480. The load instruction may be retired by, for example, retirement unit 240.

If a source store from the candidate stores can not be identified or the predicted store ID of the load does not match the identified store ID of the source store instruction, the backend of the pipeline may be cleared and the load instruction may be re-executed without memory renaming, as shown in boxes 455, 460 and 470.

Figure 5:
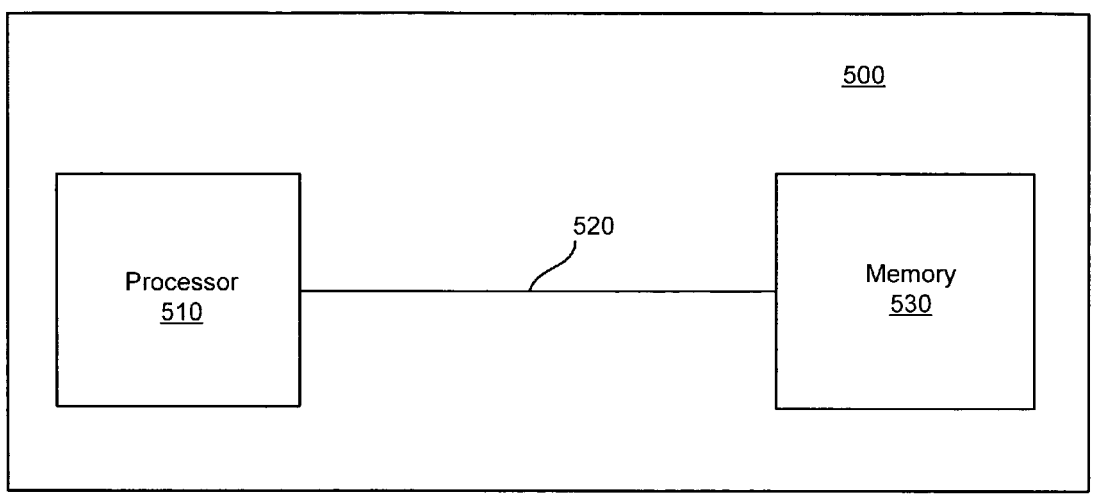
FIG. 5 is a system in accordance with an embodiment of the present invention.

FIG. 5 shows a computer system 500 in accordance with embodiments of the present invention. The system 500 may include, among other components, a processor 510, a memory 530 and a bus 520 coupling the processor 510 to memory 530.

In embodiments of the present invention, the processor 510 in system 500 may incorporate the functionality as described above. It is recognized that the processor 510 may include any variation of the systems and/or components described herein that are within the scope of the present invention.

In embodiments of the present invention, the memory 530 may store data and/or instructions that may be processed by processor 510. In operation, for example, components in the processor 510 may request data and/or instructions stored in memory 530. Accordingly, the processor may post a request for the data on the bus 520. In response, the memory 530 may post the requested data and/or instructions on the bus 520. The processor may read the requested data from the bus 520 and process it as needed.

In embodiments of the present invention, the processor 510 processes one or more instructions having a corresponding store ID for each instruction. The data may be stored in main memory 530. The processor 510 may compute the store ID for an instruction to be processed. The processor 510 may examine the instruction and if the instruction is a load instruction, the processor 510 may predict that the load instruction is to be memory renamed. If the instruction is predicted to be memory renamed, the processor 510 may process the instruction in accordance with embodiments of the present invention.

In embodiments of the present invention, the processor 510 may compute a predicted store ID and the load instructions may be transformed into a MV instruction and a LDCHK instruction. The MV instruction may be processed to read data from the memory rename cache that was written during an earlier store. The data may be read from the memory rename cache based on the predicted store ID. The LDCHK operation may be performed to compare an identifier associated with an identified source store with a predicted store identifier. A source store that may provide data to the load may be identified. If the predicted store ID matches the store ID of the identified source store, then the memory reaming operation was successful and the processor 510 may retire the load instruction.

On the other hand, if the predicted store ID of the load does not match the identified store ID of the source store instruction, the processor 510 may clear the backend of the processor pipeline and the load instruction may be re-executed by the processor 510 without memory renaming.

Embodiments of the present invention provide a technique for memory renaming that does not require changes of the RAT and offers an alternative to retrieve data from the cache such as the memory rename cache rather than the original register.

Although the present invention has been disclosed in detail, it should be understood that various changes, substitutions, and alterations may be made herein by one of ordinary skill in the art. Moreover, although software and hardware are described to control certain functions, such functions can be performed using either software, hardware or a combination of software and hardware, as is well known in the art. Likewise, in the claims below, the term "instruction" may encompass an instruction in a RISC architecture or an instruction in a CISC architecture, as well as instructions and/or micro-instructions used in other computer architectures. Other examples are readily ascertainable by one skilled in the art and may be made without departing from the spirit and scope of the present invention as defined by the following claims.

What is claimed is:

1. A processor comprising:
   a decode unit to decode a load instruction, wherein if it is predicted that an older instruction will be executed providing a different memory location for the data for the load instruction, a predicted store identifier is associated with the load instruction and the decode unit is to transform the load instruction into a data move instruction and a load check instruction;

a cache, wherein the data move instruction is to read data from the cache based on the predicted store identifier and the load check instruction is to compare an identifier associated with an identified source store with the predicted store identifier; and a retirement unit to retire the load instruction if the predicted store identifier matches the identifier associated with the identified source store.

2. The processor of claim 1, further comprising: a memory ordering buffer including a store address buffer to store an address associated with the identified source store.

3. The processor of claim 1, further comprising:
a memory ordering buffer including a store data buffer to store data associated with the identified source store.

4. The processor of claim 1, further comprising:
a memory ordering buffer to order the load instruction against store instructions in an instruction pipeline.

5. The processor of claim 1, wherein the identified source store is to provide data for the load instruction.

6. The processor of claim 1, wherein the cache is a memory rename cache.

7. The processor of claim 1, wherein the retirement unit is to clear the back-end of an instruction pipeline and to re-execute the load instruction without memory renaming if the predicted store identifier does not match the identifier associated with the identified source store.

8. A method comprising:
generating a predicted store identifier associated with a fetched load instruction where it is predicted that an older instruction will be executed providing a different memory location for the data for the load instruction;
transforming the load instruction into a data move instruction and a load check instruction; and
retiring the load instruction if the predicted store identifier matches an identifier associated with an identified source store.

9. The method of claim 8, further comprises:
processing the data move instruction to read data from a cache based on the predicted store ID.

10. The method of claim 8, further comprises:
processing the load check instruction to compare an identifier associated with the identified source store with the predicted store identifier.

11. The method of claim 10, further comprises:
ordering the load instruction against store instructions in an instruction pipeline of a processor to identify one or more store instructions that are older than the load instruction.

12. The method of claim 11, further comprises:
identifying one or more store instructions from the identified older store instructions that have an address and data size that is compatible with an address and data size of the load instruction.

13. The method of claim 12, further comprises:
identifying as the source store a youngest store instruction from the store instructions identified to have the compatible address and data size as the load instruction.

14. The method of claim 8, further comprises:
re-executing the load instruction using a regular memory load if the predicted store identifier does not match the identifier associated with the identified source store.

15. The method of claim 8, further comprises:
clearing a backend of an instruction pipeline if the predicted store identifier does not match the identifier associated with the identified source store.

16. A method comprising:
predicting that an instruction older than a current load instruction will be executed providing a different memory location for the data for the current load instruction; and
transforming the current load instruction into a load check instruction and a data move instruction.

17. The method of claim 16, wherein the data move instruction comprises:
reading data from a memory rename cache based on a predicted store identifier.

18. The method of claim 16, wherein the load check instruction comprises:
comparing an identifier associated with an identified source store with a predicted store identifier.

19. The method of claim 18, wherein the load check instruction comprises:
ordering the current load instruction with store instructions in an instruction pipeline of a processor to identify one or more store instructions that are older than the current load instruction.

20. The method of claim 19, further comprises:
identifying one or more store instructions from the identified older store instructions that have an address and data size that is compatible with an address and data size of the current load instruction.

21. The method of claim 20, further comprises:
identifying as the identified source store a youngest store instruction from the store instructions
identified to have the compatible address and data size as the current load instruction.

22. The method of claim 21, further comprises:
retiring the current load instruction if the predicted store identifier matches an identifier associated with the identified source store.

23. The method of claim 18, further comprises:
re-executing the current load instruction using a regular memory load if the predicted store identifier does not match the identifier associated with the identified source store.

24. The method of claim 18, further comprises:
clearing a backend of an instruction pipeline if the predicted store identifier does not match the identifier associated with the identified source store.

25. A system comprising:
a bus;
an external memory coupled to the bus, wherein the external memory is to store a plurality of instructions including a load instruction and a store instruction; and
a processor coupled to the memory via the bus, the processor including:
a cache;
a decode unit to:
transform the load instruction into a data move instruction and a load check instruction, wherein the data move instruction is to read data from the cache based on a predicted store identifier and load check instruction is to compare an identifier associated with an identified source store with the predicted store identifier, and
a retirement unit to retire the load instruction if the predicted store identifier matches an identifier associated with the identified source store.

26. The system of claim 25, wherein the processor is to clear a back-end of an instruction pipeline if the predicted store identifier does not match the identifier associated with the identified source store.

27. The system of claim 25, wherein the processor is to re-execute the load instruction using a regular memory load if the predicted store identifier does not match an identifier associated with the identified source store.

28. The system of claim 27, wherein the processor is to access the external memory if the predicted store identifier does not match an identifier associated with the identified source store.

29. The system of claim 25, wherein the processor is to order the load instruction with store instructions in an instruction pipeline.

* * * * *